United States Patent
Bendler et al.

(10) Patent No.: US 6,889,413 B2
(45) Date of Patent: May 10, 2005

(54) APPARATUS FOR RESTRAINING A SIDE IMPACT BEAM DURING A GAUGING OR ASSEMBLY OPERATION

(75) Inventors: Jens Bendler, Paderborn (DE); Marcus Willam, Salzkotten (DE)

(73) Assignee: Benteler Automobiltechnik GmbH, Paderborn (DE)

(*) Notice: Subject to any disclaimer, the term of this patent is extended or adjusted under 35 U.S.C. 154(b) by 0 days.

(21) Appl. No.: 10/747,850

(22) Filed: Dec. 29, 2003

(65) Prior Publication Data
US 2004/0201156 A1 Oct. 14, 2004

(30) Foreign Application Priority Data
Jan. 13, 2003 (DE) .......................................... 103 01 031

(51) Int. Cl.[7] .............................................. B25B 27/14
(52) U.S. Cl. .............................. 29/281.1; 269/254 CS
(58) Field of Search ........................... 29/281.1, 281.4; 269/43, 45, 24–27, 254 CS

(56) References Cited

U.S. PATENT DOCUMENTS

| | | | | |
|---|---|---|---|---|
| 4,691,905 A | * | 9/1987 | Tamura et al. ................. | 269/45 |
| 5,192,058 A | * | 3/1993 | VanDalsem et al. .......... | 269/24 |
| 5,330,167 A | * | 7/1994 | Plumb .......................... | 269/43 |
| 6,299,151 B1 | * | 10/2001 | Smith .......................... | 269/32 |

* cited by examiner

Primary Examiner—Lee D. Wilson
(74) Attorney, Agent, or Firm—Henry M. Feiereisen

(57) ABSTRACT

A restraining apparatus for securing a position of a side impact beam having U-shaped or trapezoidal cross section and formed with at least partially flattened ends, for execution of a subsequent, includes two support blocks for supporting the ends. Associated to the support blocks are two vertical clamping units, wherein the support blocks and the clamping units are placed into one-to-one correspondence. The restraining apparatus further includes a stop member for abutment by one of the ends, and two transverse clamping units intended for clamping length sections of the side impact beam between the beam ends.

10 Claims, 2 Drawing Sheets

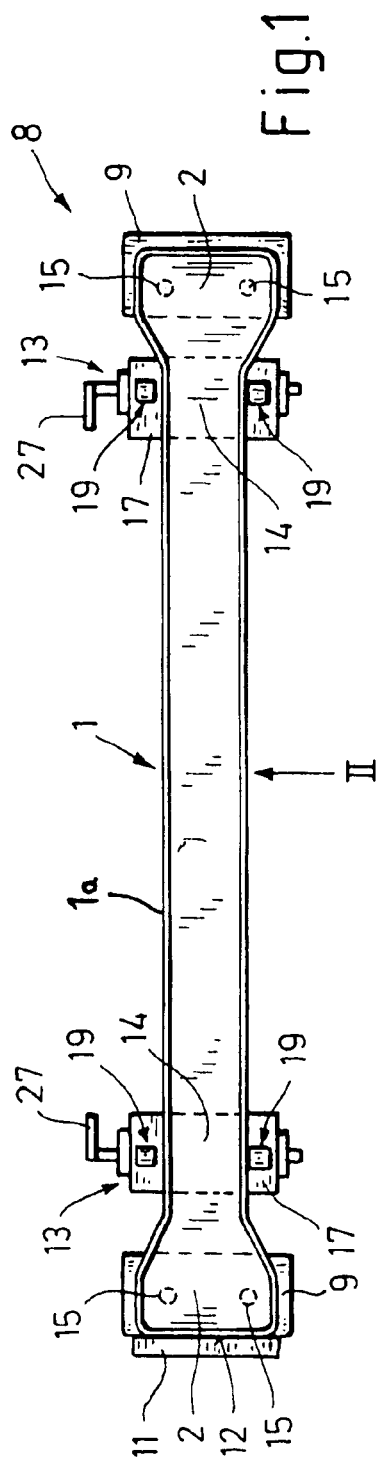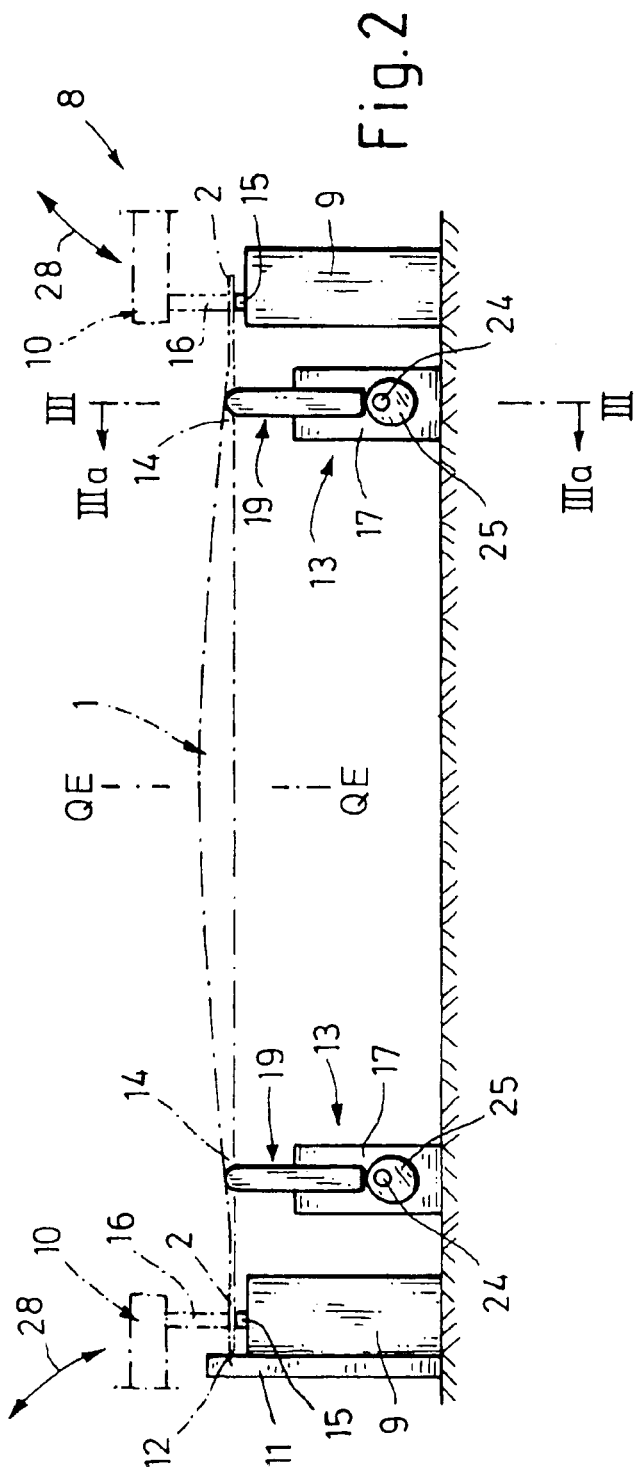

APPARATUS FOR RESTRAINING A SIDE IMPACT BEAM DURING A GAUGING OR ASSEMBLY OPERATION

CROSS-REFERENCES TO RELATED APPLICATIONS

This application claims the priority of German Patent Application, Serial No. 103 01 031.9, filed Jan. 13, 2003, pursuant to 35 U.S.C. 119(a)–(d), the disclosure of which is incorporated herein by reference.

BACKGROUND OF THE INVENTION

The present invention relates, in general, to a restraining apparatus, and more particularly to a restraining apparatus for securing a position of a side impact beam of U-shaped or trapezoidal cross section during a gauging or assembly process.

Side impact beams are highly critical safety components in the automobile industry and generally installed in sidewalls, in particular in doors of motor vehicles. Precision in manufacture of side impact beams and care for properly mounting them into the sidewalls or doors are important considerations. As side impact beams are made on a large scale, it is required to constantly inspect their dimensional accuracy and to enable a repetition of various assembly steps in reproducible manner.

It is known to secure side impact beams in place for subsequent gauging or assembly operations by providing their flat ends with fastening bores in which pins are received to maintain a centered disposition. As a consequence of the provision of such centering pins, the devices used for carrying out gauging, assembly or manufacturing procedures are complicated to make and expensive in view of the necessary precision, and moreover the provision of fastening bores result in a weakening of the flat ends of the side impact beams, rendering them less capable to withstand stress. Also, the stress profile is adversely affected by the breach in the stress flux.

It would therefore be desirable and advantageous to provide an improved restraining apparatus for securing a position of a side impact beam during a gauging or assembly operation, which apparatus obviates prior art shortcomings and is simple in structure and yet precise, without adversely affecting the stress-absorbing capability of the flat ends of the side impact beam.

SUMMARY OF THE INVENTION

According to one aspect of the present invention, an apparatus for securing a position of a side impact beam having U-shaped or trapezoidal cross section and formed with at least partially flattened ends, for execution of a subsequent gauging or assembly operation, includes two support blocks for supporting the ends, two vertical clamping units associated to the support blocks, wherein the support blocks and the clamping units are placed into one-to-one correspondence, a stop member for abutment by one of the ends, and two transverse clamping units intended for clamping length sections of the side impact beam between the ends.

The present invention resolves prior art problems by securing the flat ends of the side impact beam only via points of contact for a subsequent gauging or assembly operation so that the flat ends are not weakened by fastening bores, regardless at which angle the ends are arranged in relation to the remaining length profile of the side impact beam. The absence of any fastening bores enhances the stress-absorbing capability of the flat ends, in particular in the critical dynamic region. In addition, the stress profile is enhanced in view of the elimination of any breaches that may interrupt the stress flux.

The side impact beam can thus be easily placed with their ends on the support blocks whose configuration can be best suited to any inclination of the ends. Suitably, the placement of the ends of the side impact beam is realized via a three-point support. After placement of the flat ends on the support blocks, the vertical clamping units with clamping bolts, as well as the transverse clamping units, disposed adjacent to the support blocks, are moved into operative position to reliably and precisely hold the side impact beam in place, while one end of the side impact beam rests against a stop member. Once secured in place, measurements or assembly operations may be carried out on the side impact beam. Regardless in which way the side impact beam is transported from work station to work station in the assembly line, each of the working stations has the same restraining apparatus.

According to another feature of the present invention, the vertical clamping units may each be implemented by a toggle lever mechanism with clamping bolts that hold the ends from one side in cooperation with support pins which hold the ends at a contact point from the other side. In this way, the ends can be clamped in Y-direction and can subsequently be released again. Clamping in Z-direction is realized by the transverse clamping units which can be pressed from the sides against the length section of the side impact member at an area adjacent to the ends, and can be removed therefrom again. A shift in X-direction is prevented by the stop member which is abutted by one end of the side impact beam. In this way, the side impact beam is restrained in a reproducible manner for subsequent execution of gauging or assembly procedures in each work station of an assembly line.

According to another feature of the present invention, each of the transverse clamping units may include two elbow levers swingably mounted about horizontal axes in parallel relationship, wherein each elbow lever has a vertical arm, a horizontal arm connected to the vertical arm, and an eccentric, with the eccentric of one elbow lever and the eccentric of the other elbow lever rotatable about a common horizontal axis so as to allow a contact of the horizontal arms with the eccentrics in opposition to an elastic restoring force. Through rotation of the eccentrics, the elbow levers can be commonly pivoted to thereby force the vertical arms laterally against the side impact beam. As a result, after one beam end rests against the stop member, the side impact beam is precisely positioned and can be locally secured by the vertical clamping units for calibration or assembly.

Suitably, the contact areas of the elbow levers with the side impact beam, on the one hand, and the eccentrics, on the other hand, have a convex configuration.

According to another feature of the present invention, the elastic restoring force may be realized by compression springs which load the vertical arms of the elbow levers.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic top view of a restraining apparatus for securing a side impact beam in position in accordance with the present invention;

FIG. 2 is a schematic side view of the restraining apparatus, as viewed in a direction of arrow II;

DETAILED DESCRIPTION OF PREFERRED EMBODIMENTS

Figure 3:
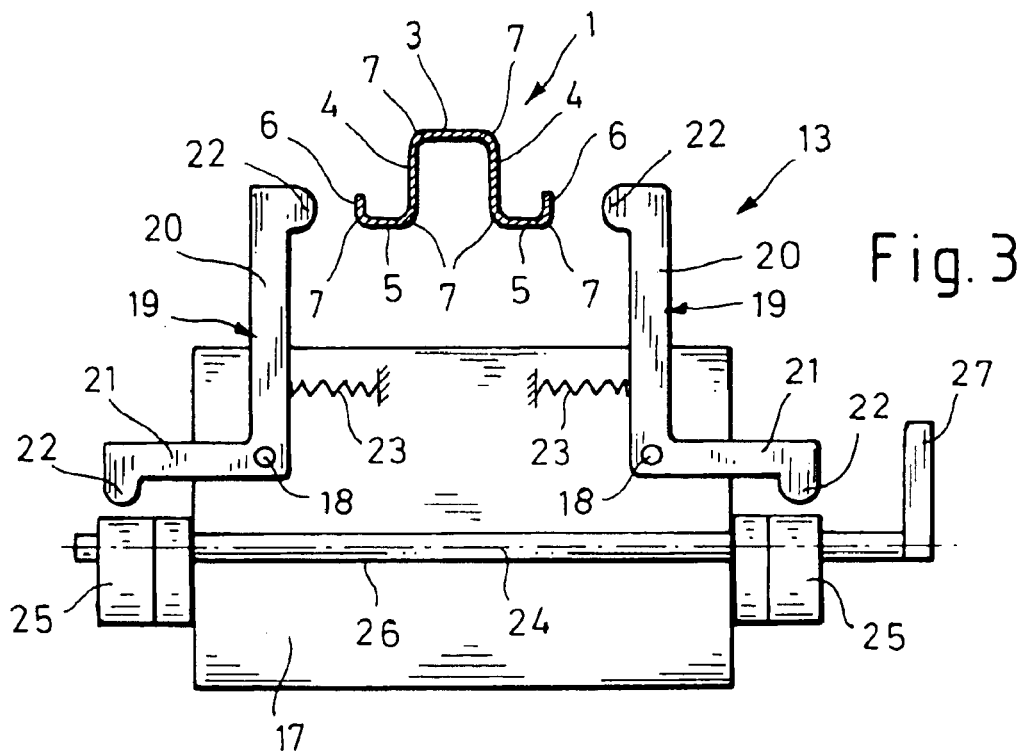
FIG. 3 is a vertical section, on an enlarged view of the restraining apparatus, taken along the line III—III in a direction of arrows IIIa and depicting a transverse clamping unit of the restraining apparatus in an idle position.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 4:
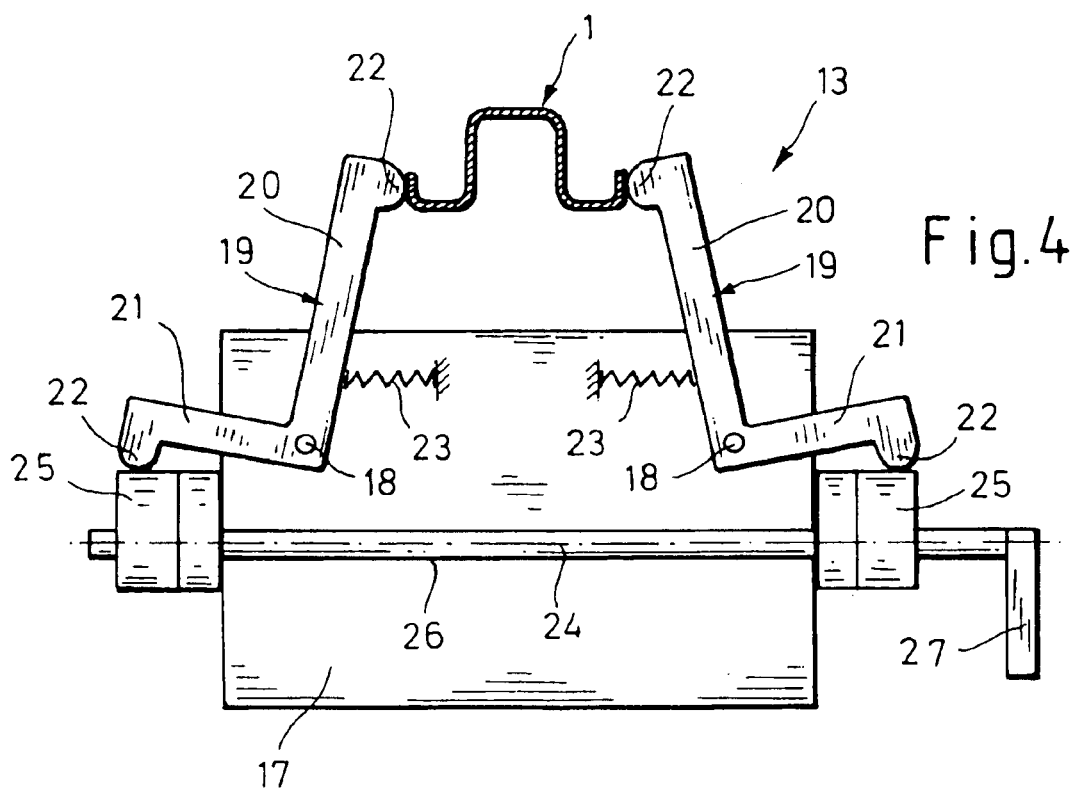
FIG. 4 is a vertical section, on an enlarged view of the restraining apparatus of FIG. 3, with the transverse clamping unit of the restraining apparatus a clamping position.

Turning now to the drawing, and in particular to FIG. 1, there is shown a schematic top view of a side impact beam, generally designated by reference numeral 1 and intended for installation in the door of a motor vehicle. The side impact beam 1 has opposite flat ends 2 and exhibits a substantially U-shaped cross section in the length section 1a between the beam ends 2, as shown in FIGS. 3 and 4. The U-shaped length section 1a includes a web 3, two flanks 4 connected to the web 3, and two flanges 5 connected to the ends of the flanks 4 and having ends 6 which are turned inwardly. All transitions 7 between the web 3 and flanks 4, between flanks 4 and flanges 5, and between flanges 5 and ends 7 have a rounded configuration. As shown in particular in FIG. 2, the length section 1a of the side impact beam 1 is so constructed that a vertical transverse plane QE in midsection has a greatest vertical dimension, whereby the vertical dimension of the length section 1a gradually and continuously decreases from the center transverse plane QE in the direction toward the flat beam ends 2.

In order to be able to secure the side impact beam 1 in a precise reproducible manner within an assembly line for execution of a subsequent gauging or assembly operation, a restraining apparatus, generally designated by reference numeral 8, is provided in accordance with the present invention. The restraining apparatus 8 includes two support blocks 9, one support block 9 for one beam end 2 and the other support block 9 for the other beam end 2 of the side impact beam 1. Associated to each of the support blocks 9 is a vertical clamping unit 10 for securing the side impact beam 1 in Y-direction. Placed adjacent to one support block 9, here the left-hand support block, is a stop member 11 for abutment of the end surface 12 of one beam end 2 of the side impact beam 1 so as to restrain the side impact beam 1 in Z-direction. Securement of the side impact beam 1 in Z-direction is realized by two transverse clamping units 13 which are disposed in an area 14 of the length section 1a, situated inwardly of the beam ends 2 of the side impact beam 1.

Each support block 9 is provided with outwardly projecting support pins 16, as shown in FIG. 2. The support pins 15 have a pointed tip to support the beam ends 2 at contact points. Normally, each support block 9 has three such support pins 15 to effect a three-point support. Cooperating with the support pins 15 are an equal number of clamping bolts 16 of the vertical clamping unit 10 which is configured as toggle lever mechanism. Thus, as shown in particular in FIG. 2, the beam ends 2 are held between the support pins 15 and the clamping bolts 16.

Each of the transverse clamping unit 13 includes a support column 5 and two elbow levers 19 which are swingably mounted in the support column 17 for rotation about horizontal axes 18 in parallel relationship. Each elbow lever 19 includes a vertical arm 20 and a horizontal arm 21 connected to one another to define a substantially L-shaped configuration, as shown in FIGS. 3 and 4. The free ends 22 of the vertical arm 20 and the horizontal arm 21, distal to the horizontal axis 18, exhibit a bulbed or convex configuration to form a contact point.

While the vertical arm 20 of each elbow lever 19 is loaded by a compression spring 23 to seek the idle position, shown in FIG. 3, the horizontal arm 21 thereof is intended to cooperate with an eccentric 25, whereby the eccentrics 25 of both elbow levers 19 are mounted on a shaft 26 for rotation about a common horizontal axis 24. The shaft 26 is rotatably mounted in the support column 17 in a manner not shown in detail and can be caused to rotate by a hand lever 27 which is mounted onto one end of the shaft 26.

Securement of the side impact beam 1 in a work station of an assembly line is realized as follows: the side impact beam 1 is first placed with the beam ends 2 upon the support pins 15 of the support blocks 9 between the vertical arms 20 of the elbow levers 19, whereby the side impact beam 1 is shifted until the end surface 12 of one beam end 2 rests against the stop member 11. Once the side impact beam 1 is positioned in this manner, the shaft 26 in each of the support columns 17 is turned by the hand lever 27 to thereby move the eccentrics 25 and thus to pivot the elbow levers 19 on opposite sides of the length section 1a from the position, shown in FIG. 3, into the clamping position against the length section 1a of the side impact beam 1, as shown in FIG. 4. The side impact beam 1 is thus held in X- and Z-directions. Then, the vertical clamping units 10 with their clamping bolts 16 are moved downwards, as indicated by arrows 18 (FIG. 2) until the clamping bolts 16 are in axial alignment with the support pins 15 on the support blocks 9. The ends 2 of the side impact beam 1 are then also firmly held in Y-direction. The desired operation on the side impact beam 1 can now be carried out.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. Apparatus for securing a position of a side impact beam having U-shaped or trapezoidal cross section and formed with at least partially flattened ends, for execution of a subsequent, comprising:

two support blocks for supporting the ends;

two vertical clamping units associated to the support blocks, wherein the support blocks and the clamping units are placed into one-to-one correspondence;

a stop member for abutment by one of the ends; and two transverse clamping units intended for clamping length sections of the side impact beam between the ends.

2. The apparatus of claim 1, wherein each of the transverse clamping units includes two elbow levers swingably mounted about horizontal axes in parallel relationship, each elbow lever having a vertical arm, a horizontal arm connected to the vertical arm, and an eccentric, wherein the eccentric of one elbow lever and the eccentric of the other elbow lever are rotatable about a common horizontal axis for contacting the horizontal arms in opposition to an elastic restoring force.

3. The apparatus of claim 2, wherein the horizontal arms of the two elbow levers extend in opposite directions.

4. The apparatus of claim 2, wherein the elastic restoring force is realized by compression springs which load the vertical arms of the elbow levers.

5. Apparatus for securing a side impact beam in place for allowing execution of a subsequent processing operation, comprising:

a support block for supporting one end of the side impact beam;

a first clamping unit for holding the end in cooperation with the support block to thereby secure the side impact beam in Y-direction;

a stop member for abutment of another end of the side impact beam to thereby secure the side impact beam in X-direction; and a second clamping unit movable into a clamping position in which a length section of the side impact beam, extending inwardly of the end, is clamped from opposite sides to thereby secure the side impact beam in Z-direction.

6. The apparatus of claim 5, wherein the end is held on the support block by a three-point contact.

7. The apparatus of claim 5, wherein the first clamping unit includes a clamping bolt, and the support block includes a support pin having a pointed end, said clamping bolt and said support pin holding the one end at a point of contact therebetween.

8. The apparatus of claim 5, wherein the second clamping unit includes two elbow levers swingably mounted on opposite sides of the side impact beam for rotation about horizontal axes in parallel relationship, and two eccentrics mounted on a common shaft for moving the elbow levers into the clamping position in opposition to an elastic restoring force.

9. The apparatus of claim 8, wherein the elastic restoring force is realized by two compression springs for loading the vertical arms of the elbow levers in a direction away from the operative position.

10. The apparatus of claim 8, wherein the horizontal and vertical arms of each elbow lever have each a free end shaped in a convex configuration.

* * * * *